United States Patent
Akkarakaran et al.

(10) Patent No.: US 10,028,304 B2
(45) Date of Patent: Jul. 17, 2018

(54) BEAM CORRESPONDENCE INDICATION, UE CALIBRATION INDICATION, AND SYNCHRONIZATION INFORMATION FOR TDD RACH PROCEDURE

(71) Applicant: QUALCOMM Incorporated, San Diego, CA (US)

(72) Inventors: Sony Akkarakaran, Poway, CA (US); Tao Luo, San Diego, CA (US); Sumeeth Nagaraja, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,415

(22) Filed: Sep. 19, 2017

(65) Prior Publication Data
US 2018/0103492 A1 Apr. 12, 2018

Related U.S. Application Data

(60) Provisional application No. 62/405,768, filed on Oct. 7, 2016.

(51) Int. Cl.
*H04L 5/14* (2006.01)
*H04W 74/08* (2009.01)
(Continued)

(52) U.S. Cl.
CPC ...... *H04W 74/0833* (2013.01); *H04B 7/0695* (2013.01); *H04B 7/088* (2013.01);
(Continued)

(58) Field of Classification Search
CPC ........... H04W 74/0833; H04W 56/001; H04W 72/046; H04W 24/10; H04W 76/046;
(Continued)

(56) References Cited

U.S. PATENT DOCUMENTS

2009/0270094 A1* 10/2009 Ito ............... H04W 56/0045
 455/434
2015/0163730 A1* 6/2015 Zhang ............ H04W 48/16
 370/329
(Continued)

FOREIGN PATENT DOCUMENTS

WO WO-2011005163 A1 1/2011

OTHER PUBLICATIONS

Interdigital Communications: "Impact of UE Calibration in a Reciprocity-Based UL MIMO Transmission", 3GPP DRAFT; R1-1609904, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 1, 2016, XP051159734, Retrieved from the Internet: URL:http://www.3gpp.org/ftp/tsg ran/WG1_RL1/TSGR1_86b/Docs/ [retrieved on Oct. 1, 2016], 4 pages.
(Continued)

*Primary Examiner* — Afshawn M Towfighi
(74) *Attorney, Agent, or Firm* — Qualcomm IP Dept.; James Hunt Yancey, Jr.

(57) ABSTRACT

Certain aspects of the present disclosure provide techniques for beam correspondence indication, user equipment (UE) calibration indication, and synchronization information for time division duplexed (TDD) random access channel (RACH) procedure. According to certain aspects, a method of wireless communication by a wireless device is provided. The method generally includes determining whether beam correspondence applies between the wireless device and another wireless device and based on the determination, providing an indication to the other wireless device of whether beam correspondence applies.

30 Claims, 9 Drawing Sheets

(51) Int. Cl.
| | |
|---|---|
| *H04W 76/27* | (2018.01) |
| *H04L 5/00* | (2006.01) |
| *H04L 27/26* | (2006.01) |
| *H04W 24/10* | (2009.01) |
| *H04W 56/00* | (2009.01) |
| *H04W 72/04* | (2009.01) |
| *H04W 76/04* | (2009.01) |
| *H04B 7/06* | (2006.01) |
| *H04B 7/08* | (2006.01) |
| *H04W 72/00* | (2009.01) |
| *H04W 88/02* | (2009.01) |

(52) U.S. Cl.
CPC .............. *H04L 5/0048* (2013.01); *H04L 5/14* (2013.01); *H04L 27/2608* (2013.01); *H04W 24/10* (2013.01); *H04W 56/001* (2013.01); *H04W 72/00* (2013.01); *H04W 72/046* (2013.01); *H04W 76/046* (2013.01); *H04W 76/27* (2018.02); *H04W 88/02* (2013.01)

(58) Field of Classification Search
CPC .. H04W 88/02; H04L 5/0048; H04L 27/2608; H04L 5/14
See application file for complete search history.

(56) References Cited

U.S. PATENT DOCUMENTS

2016/0037450 A1* 2/2016 Richards .......... H04W 52/0209
 370/311
2016/0302153 A1* 10/2016 Martin .............. H04W 52/0212
2017/0251460 A1* 8/2017 Agiwal ............. H04W 72/0406

OTHER PUBLICATIONS

Partial International Search Report—PCT/US2017/052460—ISA/EPO—dated Nov. 29, 2017.
Samsung: "Impact of Beam/Channel Reciprocity for NR", 3GPP TSG RAN WG1 #86 bis, R1-1609082, Lisbon, Portugal, Oct. 10-14, 2016, pp. 1-4.
International Search Report and Written Opinion—PCT/US2017/052460—ISA/EPO—dated Mar. 16, 2018.
Samsung: "Random Access Procedure in NR", 3GPP DRAFT; R2-166065, Random Access Procedure in NR, 3rd Generation Partnership Project (3GPP), Mobile Competence Centre; 650, Route Des Lucioles; F-06921 Sophia-Antipolis Cedex; France, vol. RAN WG2, No. Kaohsiung, Taiwan; Oct. 10, 2016-Oct. 14, 2016, Sep. 30, 2016 (Sep. 30, 2016), XP051161542, 7 Pages, Retrieved from the Internet:URL:http://www.3gpp.org/ftp/tsg_ran/WG2_RL2/TSGR2_95bis/Docs/ [retrieved on Sep. 30, 2016].

* cited by examiner

BEAM CORRESPONDENCE INDICATION, UE CALIBRATION INDICATION, AND SYNCHRONIZATION INFORMATION FOR TDD RACH PROCEDURE

CROSS-REFERENCE TO RELATED APPLICATIONS & PRIORITY CLAIM

This application claims benefit of and priority to U.S. Provisional Patent Application Ser. No. 62/405,768, filed Oct. 7, 2016, which is herein incorporated by reference in its entirety for all applicable purposes.

TECHNICAL FIELD

Aspects of the present disclosure relate generally to wireless communications systems, and more particularly, to beam correspondence indication, user equipment (UE) calibration indication, and synchronization information for time division duplexed (TDD) random access channel (RACH) procedures.

INTRODUCTION

Wireless communication systems are widely deployed to provide various telecommunication services such as telephony, voice, video, data, messaging, broadcasts, and so on. These systems may employ multiple-access technologies capable of supporting communication with multiple users by sharing available system resources (e.g., bandwidth and transmit power). Examples of such multiple-access technologies include 3$^{rd}$ Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. Multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Generally, a wireless multiple-access communication system can simultaneously support communication for multiple wireless nodes. Each node communicates with one or more base stations (BSs) via transmissions on forward and reverse links. The forward link (or downlink) refers to a communication link from BSs to nodes, and a reverse link (or uplink) refers to a communication link from nodes to base stations. Communication links may be established via a single-input single-output, multiple-input single-output, or a MIMO system.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A BS or DU may communicate with a set of UEs on downlink channels (e.g., for transmissions from a BS or to a UE) and uplink channels (e.g., for transmissions from a UE to a BS or DU).

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for beam correspondence indication, user equipment (UE) calibration indication, and synchronization information for time division duplexed (TDD) random access channel (RACH) procedures.

Certain aspects of the present disclosure provide a method for wireless communication that may be performed, for example, by a wireless device for beam correspondence indication. The method generally includes determining whether beam correspondence applies between the wireless device and another wireless device. Based on the determination, the wireless device provides an indication to the other wireless device of whether beam correspondence applies.

Certain aspects of the present disclosure provide a method for wireless communication that may be performed, for example, by a wireless device for synchronization information for TDD RACH. The method generally includes receiving a random access response message from a wireless node and transmitting a radio resource control (RRC) connection request message to the wireless node. The RRC request message includes a payload and also includes a synchronization sequence and/or a demodulation reference signal.

Certain aspects of the present disclosure provide an apparatus for wireless. The apparatus generally includes means for determining whether beam correspondence applies between the apparatus and a wireless device and means for providing an indication to the wireless device of whether beam correspondence applies based on the determination.

Certain aspects of the present disclosure provide an apparatus for wireless communication. The apparatus generally includes means for receiving a random access response message from a wireless node and means for transmitting a RRC connection request message to the wireless node. The RRC request message includes a payload and also includes a synchronization sequence and/or a demodulation reference signal.

Certain aspects of the present disclosure provide an apparatus for wireless. The apparatus generally includes at least one processor coupled with a memory. The processor is configured to determine whether beam correspondence applies between the apparatus and a wireless device. The apparatus includes a transmitter configured to provide an indication to the wireless device of whether beam correspondence applies based on the determination.

Certain aspects of the present disclosure provide an apparatus for wireless communication. The apparatus generally includes a receiver configured to receive a random access response message from a wireless node and a transmitter configured to transmit a RRC connection request message to the wireless node. The RRC request message includes a payload and also includes a synchronization sequence and/or a demodulation reference signal.

Certain aspects of the present disclosure provide a computer readable medium having computer executable code stored thereon for wireless communication. The computer executable code generally includes code for determining whether beam correspondence applies between a wireless device and another wireless device and code for providing an indication to the other wireless device of whether beam correspondence applies based on the determination.

Certain aspects of the present disclosure provide a computer readable medium having computer executable code stored thereon for wireless communication. The computer executable code generally includes code for receiving a random access response message from a wireless node and code for transmitting a RRC connection request message to the wireless node. The RRC request message includes a payload and also includes a synchronization sequence and/or a demodulation reference signal.

Other aspects, features, and embodiments of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method embodiments such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
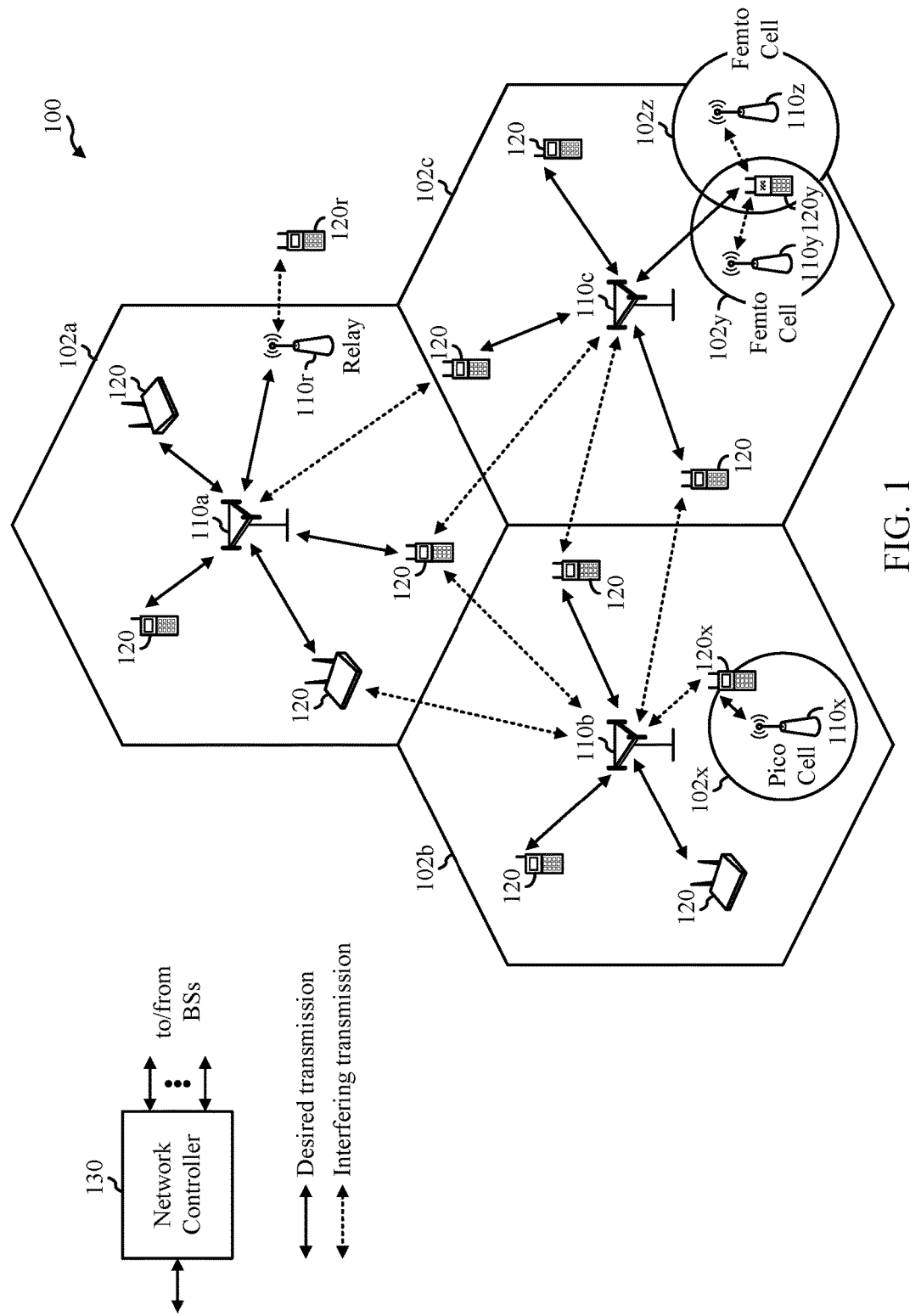
FIG. 1 is a block diagram conceptually illustrating an example wireless communication system, in accordance with certain aspects of the present disclosure.

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Some wireless communication systems, such as NR, use beam sweeping. In some cases, beam correspondence (where the best beam for the uplink and downlink channels are assumed to be the same), sometimes referred to as "reciprocity" can be violated.

Aspects of the present disclosure provide techniques and apparatus for beam correspondence indication, user equipment (UE) calibration indication, and synchronization information for time division duplexed (TDD) random access channel (RACH) procedure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed.

For example, the wireless network may be a new radio (NR) or 5G network. UE 120 determines whether beam correspondence applies between the UE 120 and a wireless device, such as a BS 110 or another UE 120. Based on the determination, the UE 120 provides an indication to the wireless device of whether beam correspondence applies.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and next generation NB (gNB), Node B, 5G NB, access point (AP), NR BS, NR BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using TDD. A single component carrier bandwidth of 100 MHz may be supported. NR resource blocks may span 12 subcarriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G NB, NB, TRP, AP) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
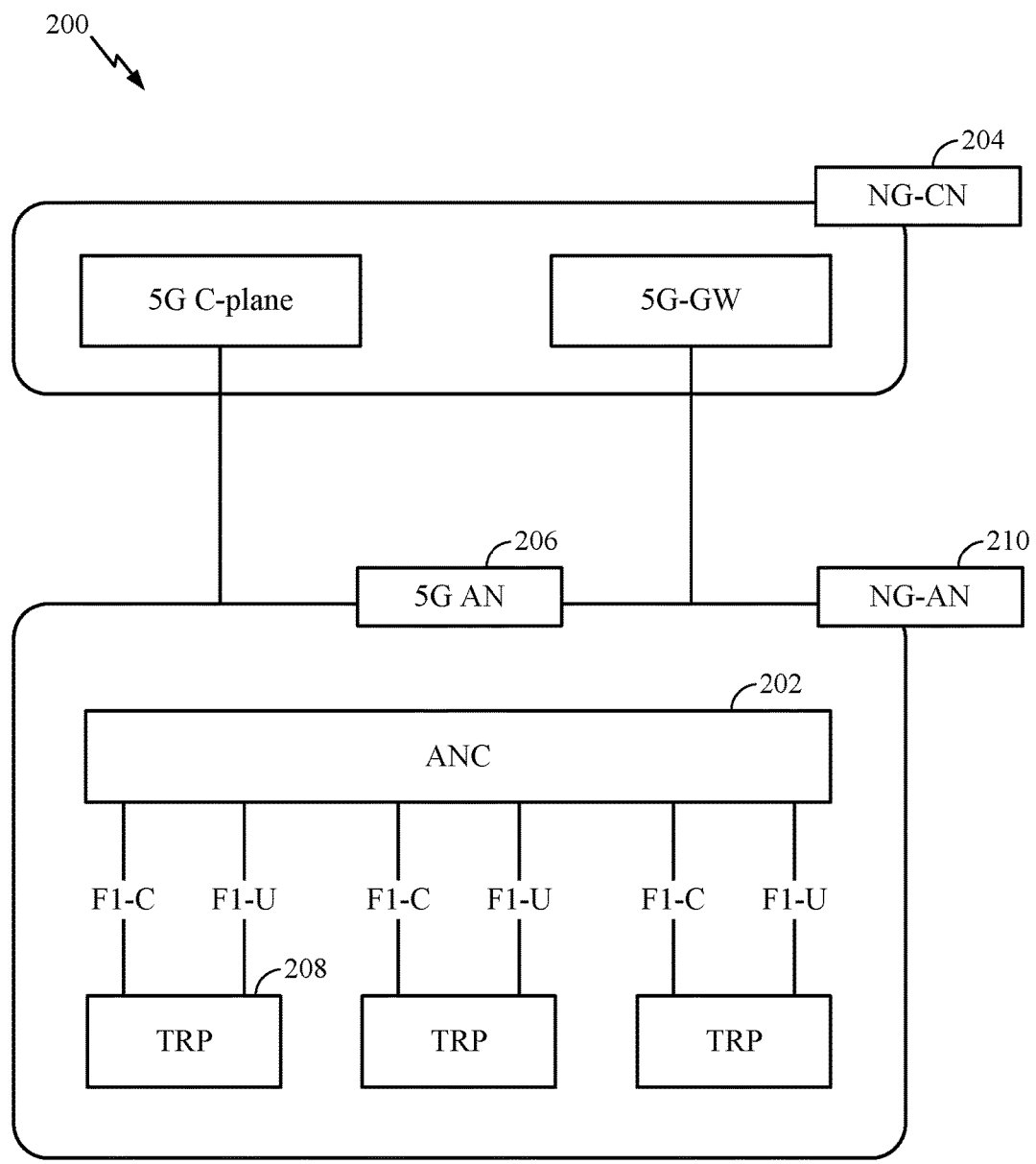
FIG. 2 is a block diagram illustrating an example logical architecture of a distributed radio access network (RAN), in accordance with certain aspects of the present disclosure.

FIG. 2 illustrates an example logical architecture 200 of a distributed radio access network (RAN), which may be implemented in the wireless network 100 illustrated in FIG. 1. A 5G access node 206 may include an access node controller (ANC) 202. The ANC 202 may be a central unit (CU) of the distributed RAN. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may support fronthauling solutions across different deployment types. For example, the architecture may be based on transmit network capabilities (e.g., bandwidth, latency, and/or jitter). The logical architecture 200 may share features and/or components with LTE. NG-AN 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Split of logical functions can be dynamically configured within the logical architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
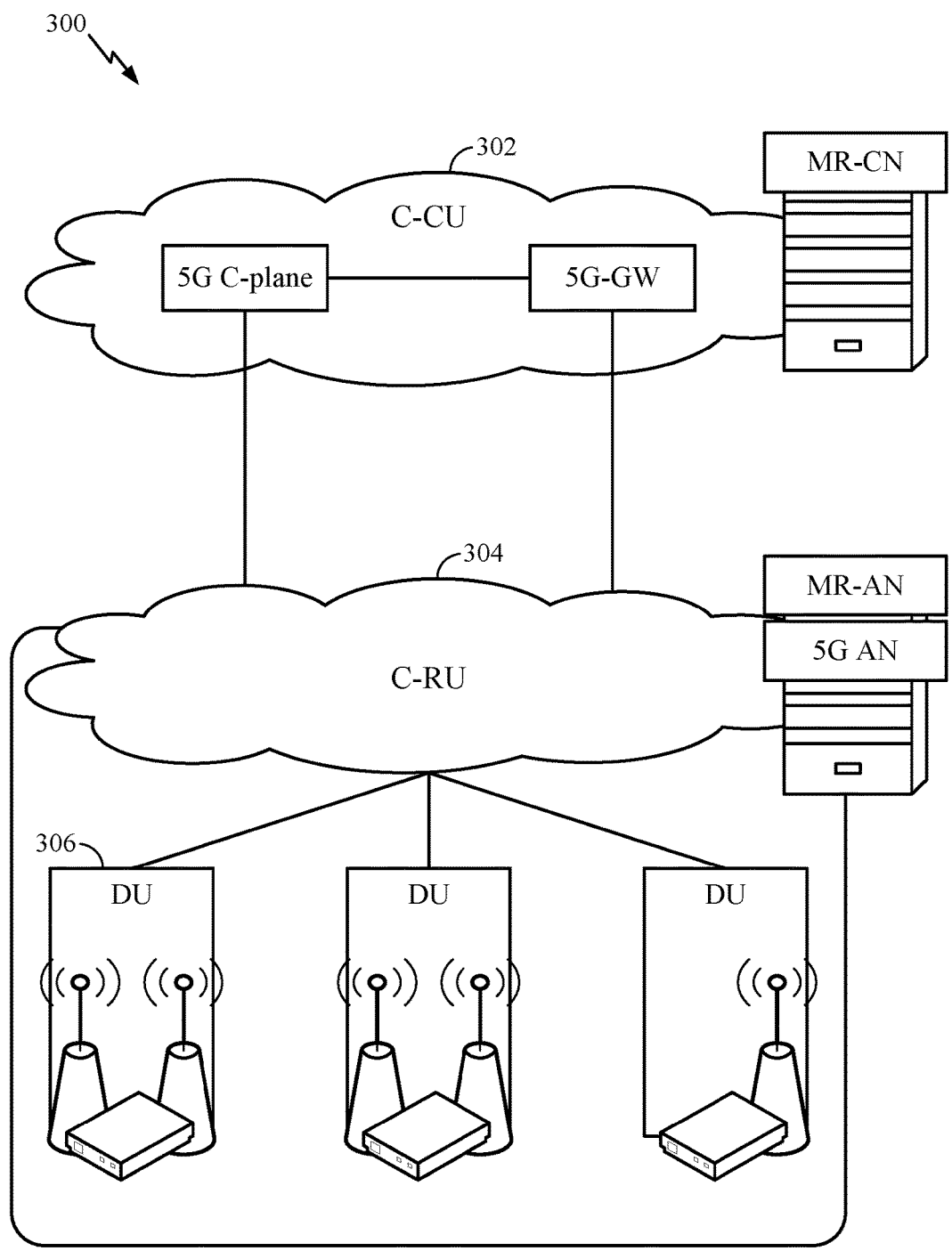
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
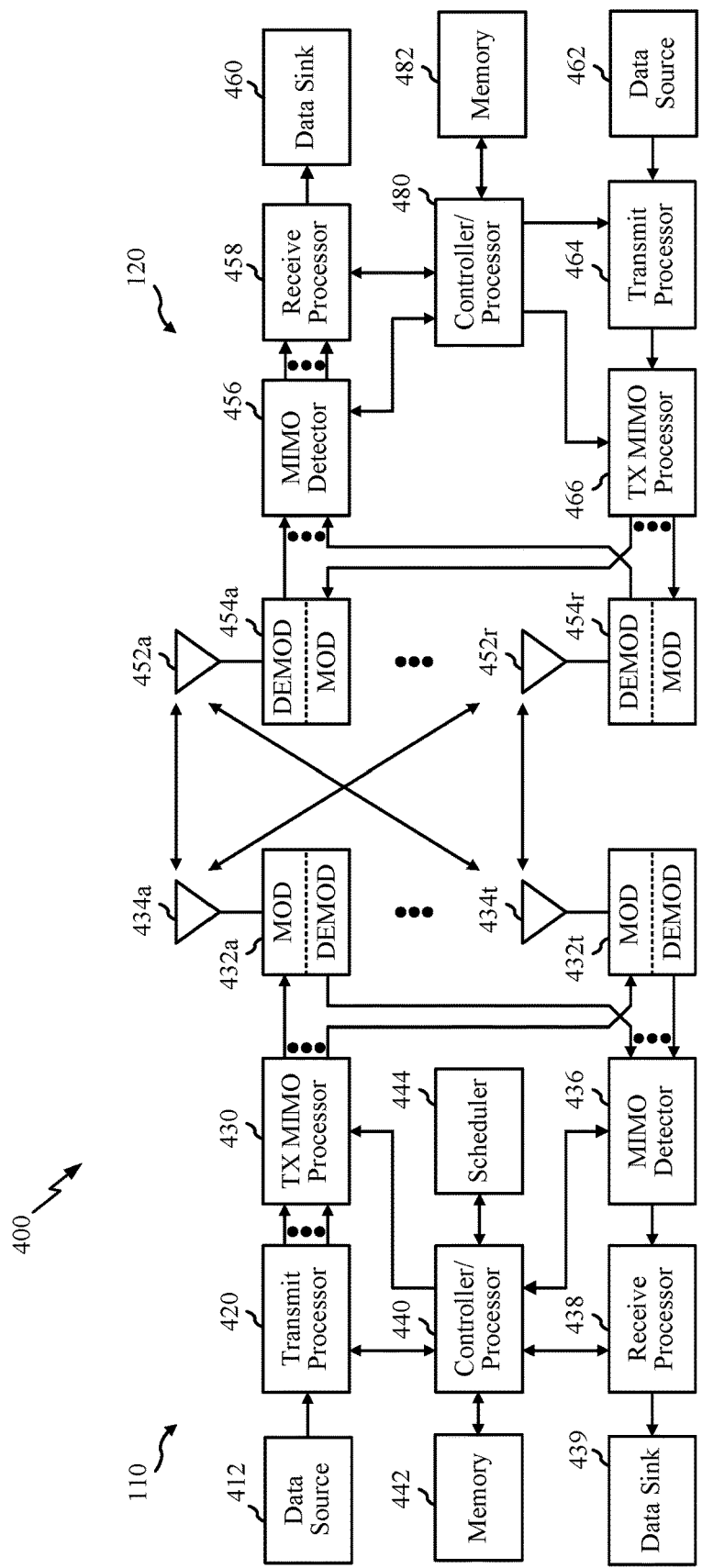
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 9 and 10.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct, e.g., the execution of various processes for the techniques described herein. The processor 480 and/or other processors and modules at the UE 120 may also perform or direct, e.g., the execution of the functional blocks illustrated in FIG. 9, and/or other processes for the techniques described herein. The processor 440 and/or other processors and modules at the BS 110 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
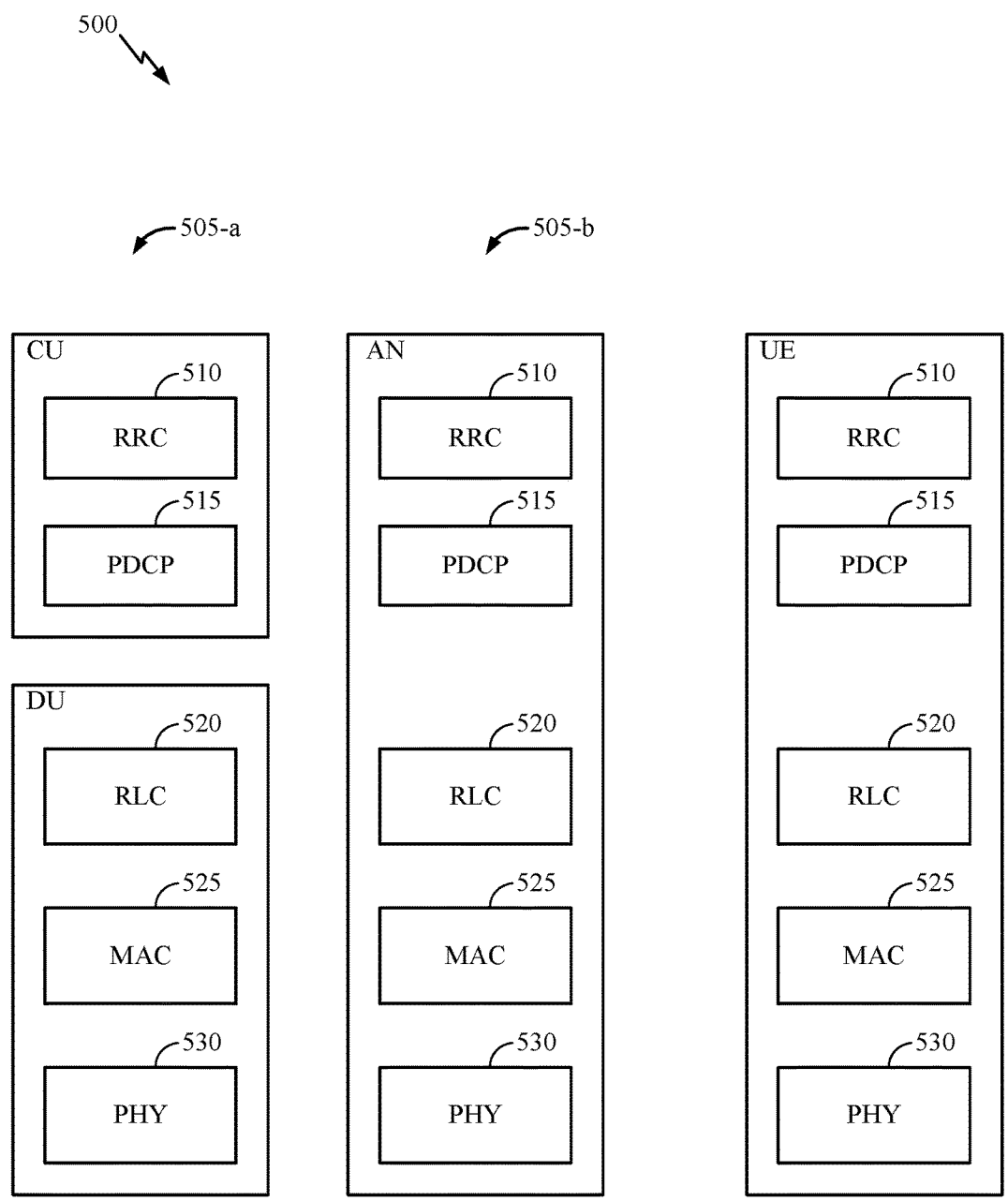
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
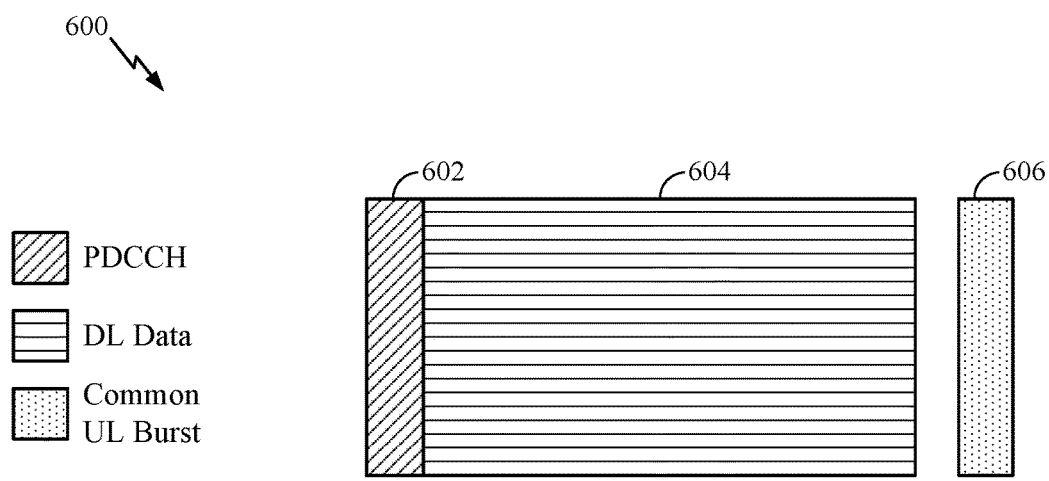
FIG. 6 illustrates an example of a downlink-centric slot, in accordance with certain aspects of the present disclosure.

FIG. 6 is a diagram showing an example of a downlink-centric slot 600 (e.g., sometimes referred to as a subframe). The downlink-centric slot 600 may include a control portion 602. The control portion 602 may exist in the initial or beginning portion of the DL-centric slot 600. The control portion 602 may include various scheduling information and/or control information corresponding to various portions of the DL-centric slot 600. In some configurations, the control portion 602 may be a physical DL control channel (PDCCH), as shown in FIG. 6. The DL-centric slot 600 may also include a DL data portion 604. The DL data portion 604 may sometimes be referred to as the payload of the DL-centric slot 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric slot 600 may also include a common UL portion 606. The common UL portion 606 may sometimes be referred to as an UL burst, a common UL burst, and/or various other suitable terms. The common UL portion 606 may include feedback information corresponding to various other portions of the DL-centric slot 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric slot and alternative structures having similar features may exist without necessarily deviating from the aspects described herein.

Figure 7:
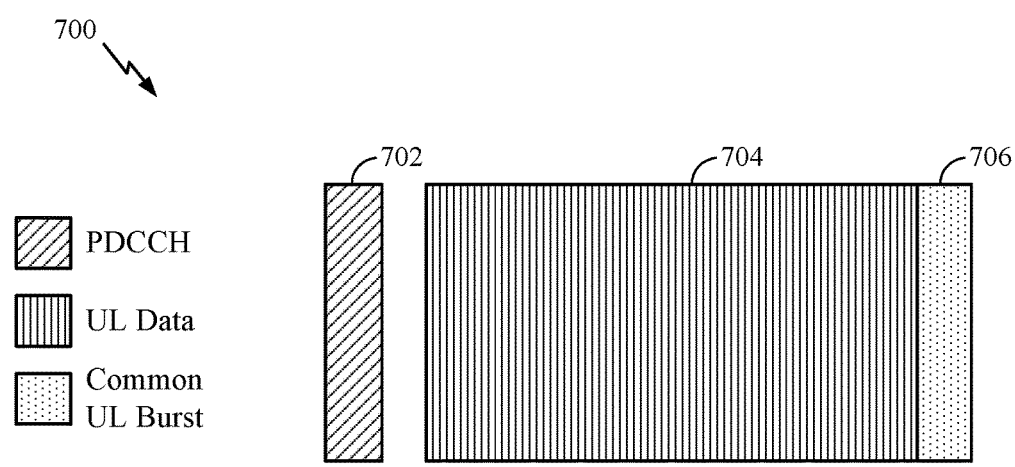
FIG. 7 illustrates an example of an uplink-centric slot, in accordance with certain aspects of the present disclosure.

FIG. 7 is a diagram showing an example of an uplink-centric slot 700. The UL-centric slot 700 may include a control portion 702. The control portion 702 may exist in the initial or beginning portion of the UL-centric slot 700. The control portion 702 in FIG. 7 may be similar to the control portion 602 described above with reference to FIG. 6. The UL-centric slot 700 may also include an UL data portion 704. The UL data portion 704 may sometimes be referred to as the payload of the UL-centric slot 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric slot 700 may also include a common UL portion 706. The common UL portion 706 in FIG. 7 may be similar to the common UL portion 706 described above with reference to FIG. 7. The common UL portion 706 may include information pertaining to channel quality indicator (CQI), sounding reference signals (SRSs), and various other suitable types of information. The foregoing is merely one example of an UL-centric slot and alternative structures having similar features may exist without necessarily deviating from the aspects described herein. In one example, a frame may include both UL-centric slots and DL-centric slots. In this example, the ratio of UL-centric slot to DL-centric slots in a frame may be dynamically adjusted based on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
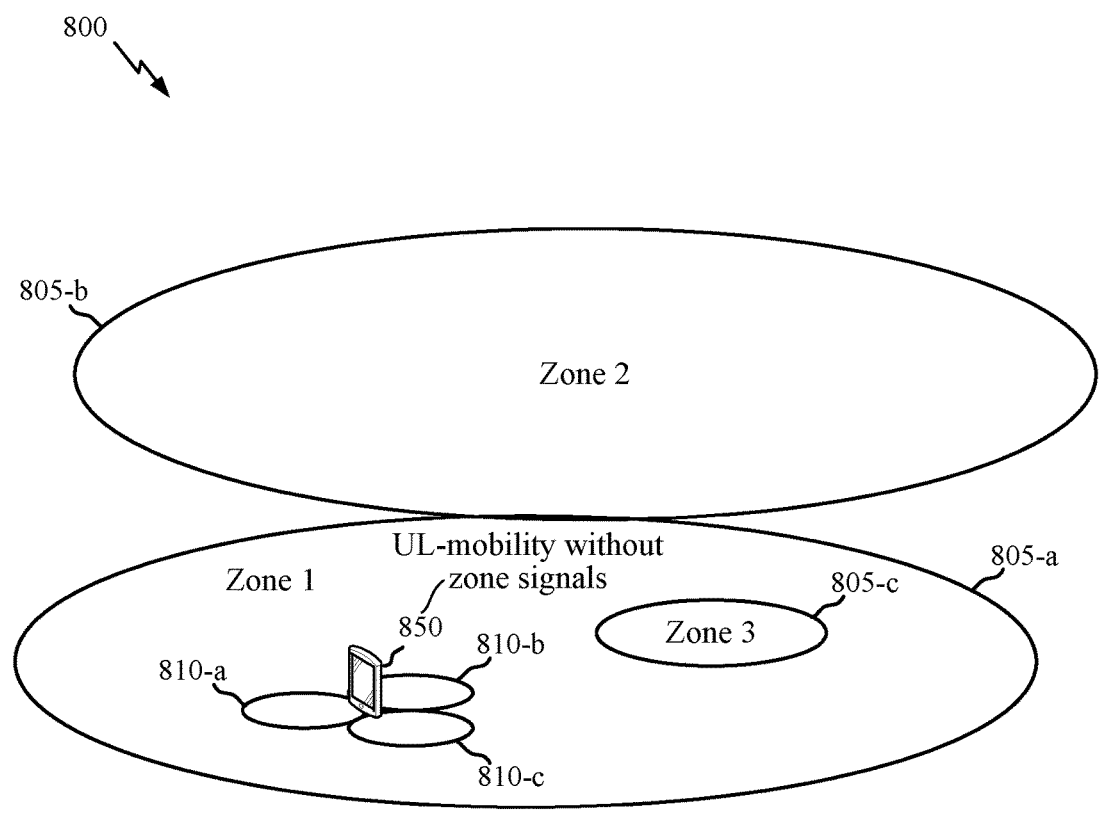
FIG. 8 illustrates an example of a wireless communication system supporting zones, in accordance with certain aspects of the present disclosure.

FIG. 8 illustrates an example of a wireless network 800 supporting a number of zones, in accordance with aspects of the present disclosure. The wireless network 800 may include a number of zones (including, e.g., a first zone 805-a (Zone 1), a second zone 805-b (Zone 2), and a third zone 805-c (Zone 3)). A number of UEs may move within or between the zones.

A zone may include multiple cells, and the cells within a zone may be synchronized (e.g., the cells may share the same timing). Wireless network 800 may include examples of both non-overlapping zones (e.g., the first zone 805-a and the second zone 805-b) and overlapping zones (e.g., the first zone 805-a and the third zone 805-c). In some examples, the first zone 805-a and the second zone 805-b may each include one or more macro cells, micro cells, or pico cells, and the third zone 805-c may include one or more femto cells.

By way of example, the UE 850 is shown to be located in the first zone 805-a. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-a may monitor the common set of resources for a pilot signal from the UE 850. If the UE 850 is operating with a radio resource configuration associated with transmitting pilot signals using a dedicated set of resource, such as an RRC dedicated state, the UE 850 may transmit a pilot signal using a dedicated set of resources. Cells of a monitoring set of cells established for the UE 850 within the first zone 805-a (e.g., a first cell 810-a, a second cell 810-b, and a third cell 810-c) may monitor the dedicated set of resources for the pilot signal of the UE 850.

Example Beam Correspondence Indication, UE Calibration Indication, and Synchronization Information for TDD RACH Procedure Certain communication systems, such as new radio (NR) access technology or 5G technology may support various wireless communication services, such as millimeter wave (mmW) service targeting high carrier frequency (e.g. 60 GHz or higher), massive machine type communication (mMTC) service targeting non-backward compatible MTC techniques, etc.

Some communication systems, such mmW systems may use analog and/or digital beamforming, for example, to compensate for high path-losses due to poor radio frequency (RF) propagation. In some cases, wireless devices may use beam sweeping procedures to allow the receiver to identify the best transmit beam. The receiver may then align it's receive beam with the identified best transmit beam. These procedures may be simplified under an assumption of channel reciprocity (e.g., also referred to herein as beam correspondence). For example, in time division duplexing (TDD), the channel reciprocity assumption may assume that the uplink and downlink channels are identical. Since uplink and downlink are assumed identical, the wireless device (e.g., transceiver) may optimize its transmit beams based on an optimal (e.g., best) receive beam. Similarly, the wireless device may optimize its receive beam based on an optimal transmit beam.

In some scenarios, the reciprocity assumption may not be valid (e.g., the best uplink beam may not be best downlink beam and/or the best downlink beam may not be the best uplink beam). In an example, the wireless device may have poor RF calibration. The poor RF calibration may be permanent, such as due to low-cost components that have poor calibration accuracy, or the poor RF calibration may be temporary, such as during a cold-start prior to RF calibration. The poor RF calibration may cause a mismatch between receive and transmit functions at the wireless device (e.g., transceiver).

In another example, different antenna configurations may be used for reception and transmission at one or both of the transceivers (e.g., a wireless device receiving on the downlink and another wireless device transmitting on the uplink), For example, a wireless device, such as a base station (BS) (e.g., or a peer-to-peer device or device-to-device) may perform beamforming separately to multiple UEs simultaneously on the downlink using antenna sub-arrays; however, the wireless device may combine those beams into a single beam to receive only from one of those UEs on the uplink.

In yet another example, for non-line-of-sight components of the channel, the material characteristics of certain reflectors may cause intrinsic loss of channel reciprocity—even in cases when the wireless device has good RF calibration and the same antenna configurations are used for uplink and downlink.

Accordingly, techniques and apparatus for wireless communications, such as beam-sweeping and random access channel (RACH) procedures that remain robust even when the reciprocity assumption is violated are desirable.

Aspects of the present disclosure provide techniques and apparatus for beam correspondence indication, UE calibration indication, and synchronization information for time division duplexed (TDD) RACH procedures.

Example Beam Correspondence Indication and UE Calibration Indication

Figure 9:
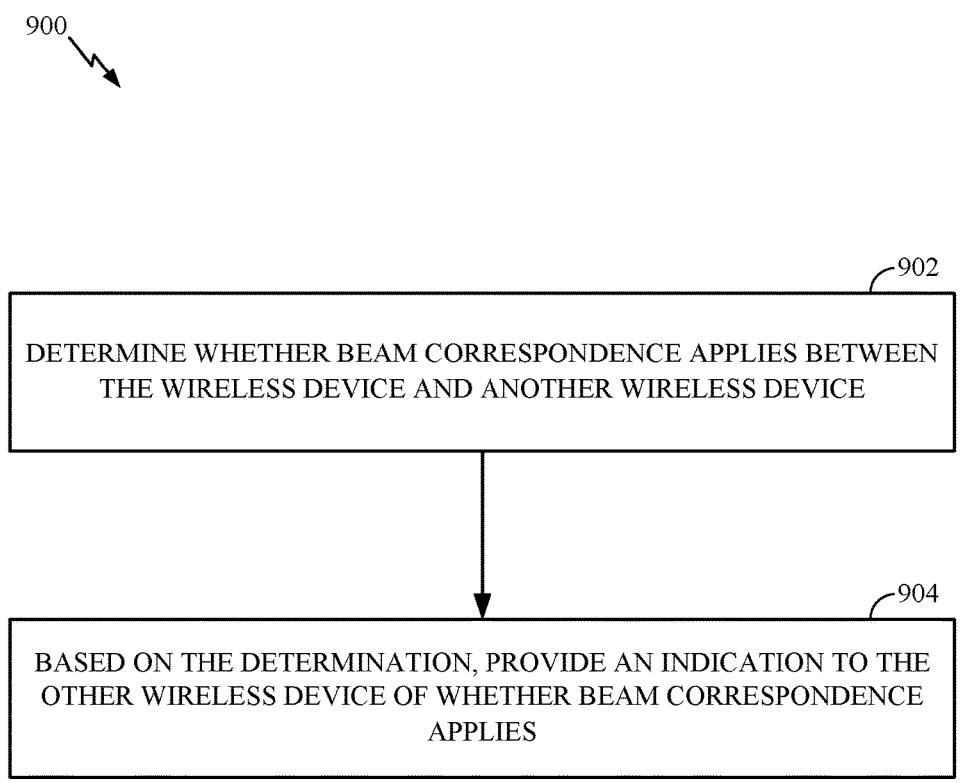
FIG. 9 is a flow diagram illustrating example operations that may be performed by a wireless device for beam correspondence indication, in accordance with certain aspects of the present disclosure.

FIG. 9 is a flow diagram illustrating example operations 900 that can be performed, for example, by a wireless device such as a UE (e.g., UE 120), a BS (e.g., BS 110), and/or a peer-to-peer device (or device-to-device) for providing a beam correspondence indication, in accordance with certain aspects of the present disclosure. Operations 900 may begin, at 902, by determining whether beam correspondence applies between the wireless device and another wireless device. At 904, based on the determination, the wireless device provides an indication to the other wireless device of whether beam correspondence applies.

According to certain aspects, the determination is based on a time or an operation state of the wireless device. For example, the wireless device can determine that beam correspondence does not apply (e.g., does not hold/is violated) if an initial random access channel (RACH) procedure has not been completed and/or if a UE calibration has not been completed. This may be the case after initial power up of the wireless device. The wireless device can determine that beam correspondence does apply if an initial RACH procedure has been completed or a UE calibration has been completed. This may be the case when the UE is in connected mode or after the UE has finished calibration. In this case, the UE can switch to PRACH resources (e.g., a sequence) indicating the beam correspondence applies.

According to certain aspects, the wireless device (e.g., a UE) can receive an inquiry from the other wireless device (e.g., a BS or peer device). The wireless device can provide the indication of whether beam correspondence applies in response to the inquiry. The inquiry can be a calibration status of the UE inquiry and the UE can provide an indication of the UE calibration in response to that request. In aspects, the inquiry (e.g., for whether beam correspondence applies and/or for UE calibration status) can be received in a random access response (RAR) (e.g., a RACH Msg2). The indication (e.g., of whether beam correspondence applies and/or of the UE calibration) can be provided in a radio resource control (RRC) connection request message (e.g., a RACH Msg3). The RRC connection request message can be swept using multiple beam directions. The directions and/or the number of directions can be indicated from the other wireless device (e.g., BS), for example, in the RAR. For example, the other wireless device (e.g., BS) can determine whether beam correspondence holds at the other wireless device and transmit the indication based on the determination. In some cases, the indication of the directions and/or number of directions can be based on a received strength of the PRACH sequence.

In some cases, the RAR message can also indicate whether beam correspondence holds at the other wireless device and the wireless device can perform beam sweeping directions for the RRC connection request based on the indication in the RAR. According to certain aspects, the RAR can include a request for a beam report and/or a query regarding whether beam correspondence holds at the wireless device.

In aspects, the indication (e.g., of whether beam correspondence applies and/or the UE calibration status) can be provided implicitly via a resource used for transmitting the indication or explicitly. For example, the indication (e.g., of the UE calibration status) can be provided in a scheduling request (SR), a payload of a buffer status report (BSR), a physical uplink control channel (PUCCH), a physical uplink shared channel (PUSCH) (e.g., via a radio resource control (RRC) signaling message carried on the PUSCH), or a physical random access channel (PRACH). In aspects, the indication can be provided by a sequence used for transmitting the PRACH (e.g., the PRACH space can be partitioned).

According to certain aspects, the wireless device can perform communications (e.g., TDD communications) with the other wireless device in accordance with the determination. For example, the PRACH transmission and/or PRACH resource can be associated with a downlink synchronization channel beam direction for reciprocal wireless devices (e.g., UE). If reciprocity is not valid, then the wireless device (e.g., UE) can select multiple beam directions for PRACH transmission. The wireless device (e.g., UE) can transmit a PRACH sequence and/or a PRACH message using beam sweeping if reciprocity does not apply. The beams directions used and/or a number of the beams used for the beam sweeping can be based on measurement of a downlink synchronization signal or a downlink reference signal (e.g., broadcast reference signal (BRS) and/or measurement reference signal (MRS)). If reciprocity applies (e.g., holds/is not violated), the wireless device can transmit PRACH using a beam selected based on a downlink synchronization channel beam direction.

As another example, the wireless device can transmit an RRC connection request message using beam sweeping if beam correspondence does not hold between the wireless devices (e.g., UE and BS or UE and peer device). According to certain aspects, the wireless device (e.g., UE) can receive signaling from the other wireless device (e.g., BS or peer device) indicating a direction of the beams to use for the beam sweeping or a number of beams to use for the beam sweeping.

According to certain aspects, based on the indication from the wireless device (e.g., the UE) of whether beam correspondence applies and/or the indication of the UE calibration status, the other wireless device (e.g., BS), can choose (e.g., adjust, select, determine) a different transmission and/or reception strategy for communicating with the wireless device (e.g., UE).

Example Msg 3 Synchronization Information

Figure 10:
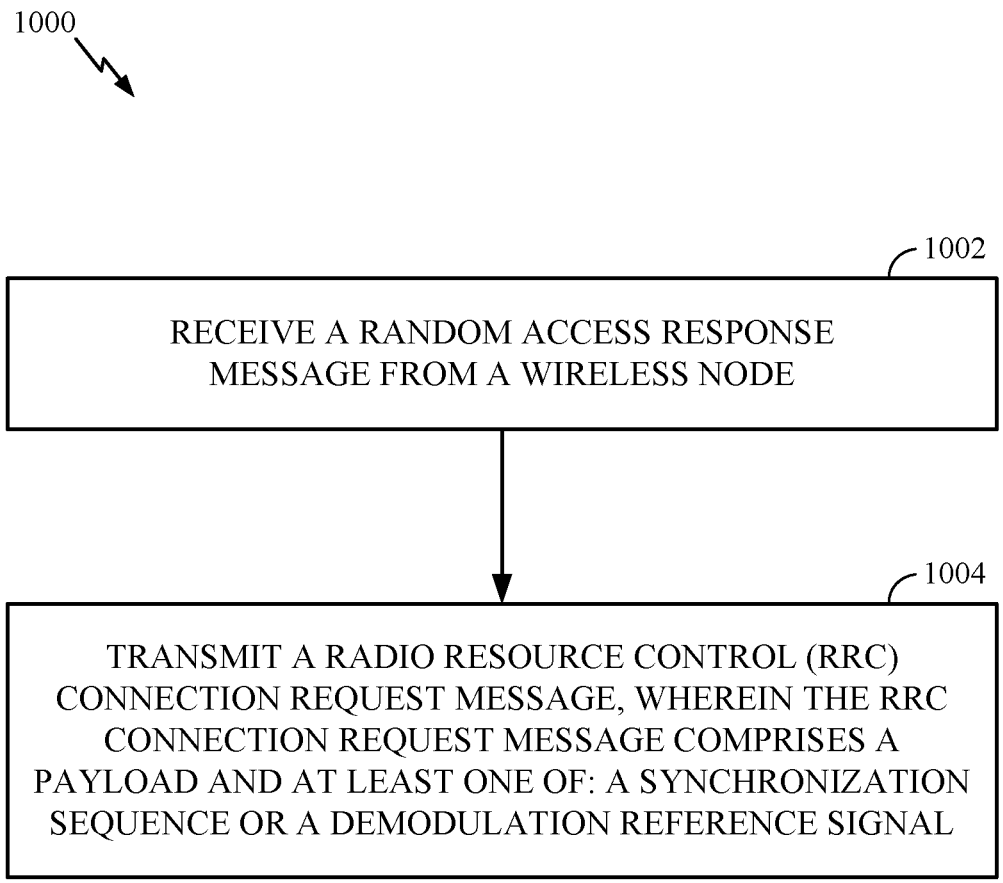
FIG. 10 is a flow diagram illustrating example operations that may be performed by a wireless device for synchronization information for a time division duplexed (TDD) random access channel (RACH) procedure, in accordance with certain aspects of the present disclosure.

FIG. 10 is a flow diagram illustrating example operations 1000 that can be performed, for example, by a wireless device such as a UE (e.g., UE 120) for synchronization information for a time division duplexed (TDD) random access channel (RACH) procedure, in accordance with certain aspects of the present disclosure. The operations 1000 may begin, at 1002, by receiving a random access response message from a wireless node. At 1004, the wireless device transmits a radio resource control (RRC) connection request message to the wireless node. The RRC connection request message includes a payload and also includes a synchronization sequence and/or a demodulation reference signal.

According to certain aspects, a RRC connection request message (e.g., RACH Msg 3) transmission can be split into a preamble synchronization sequence, the RRC connection request payload, and/or additional reference signal for demodulating (e.g., demodulation reference signals) or decoding the RRC connection request message. The synchronization sequence may be used by the other wireless device (e.g., the device receiving the RRC connection request message, such as a BS) to better receive the RRC connection request, such as for tuning of its corresponding receive beams. In aspects, the synchronization sequence could be beam-swept along with the RRC connection request payload.

According to certain aspects, the transmission can use a split-symbol approach. For example, multiple shorter orthogonal frequency division multiplexed (OFDM) or single carrier frequency division multiplex (SC-FDM) symbols (e.g., Discrete Fourier Transform (DFT)-spread-OFDM (DFT-s-OFDM) or DFT-precoded-OFDM) can be transmitted (e.g., with higher subcarrier-spacing) in the same time-duration as a single OFDM or SC-FDM symbol of regular transmission.

According to certain aspects, the splitting between synchronization sequence and the RRC connection request payload can also be achieved in case of SC-FDM at the input to the DFT-spreading operation of SC-FDM. This can be done by populating the initial symbols at the DFT input with the synchronization symbols, and the later ones with the data modulation symbols of the RRC connection request payload.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining whether beam correspondence between the UE and a base station (BS) applies at the UE, wherein determining whether beam correspondence applies comprises determining whether the UE can determine at least one of: a beam to use for uplink transmission based on a downlink reception beam or a beam to use for downlink reception based on an uplink transmission beam; and
   based on the determination, providing an indication to the BS, via a physical random access channel (PRACH) message during a RACH procedure, of whether beam correspondence applies at the UE.

2. The method of claim 1, further comprising:
   performing time division duplexing (TDD) communications with the BS in accordance with the determination.

3. The method of claim 1, wherein the determination is based on at least one of time or an operation state of the UE.

4. The method of claim 1, wherein the determination comprises determining that beam correspondence does not apply if at least one of: an initial RACH procedure has not been completed or a UE calibration has not been completed.

5. The method of claim 1, wherein the determination comprises determining that beam correspondence applies if at least one of: an initial RACH procedure has been completed or a UE calibration has been completed.

6. The method of claim 1, further comprising:
receiving an inquiry from the BS, wherein the indication is provided in response to the inquiry.

7. The method of claim 6, wherein the inquiry is received in a random access response message, and wherein the indication is provided in a radio resource control (RRC) connection request message.

8. The method of claim 1, wherein the indication is provided implicitly via a resource used for transmitting the indication or explicitly.

9. The method of claim 1, wherein the indication is provided via a PRACH sequence.

10. The method of claim 9, wherein the communicating comprises transmitting the PRACH sequence using beam sweeping if beam correspondence does not apply.

11. The method of claim 2, wherein the communicating comprises transmitting the PRACH message using a beam based on a downlink synchronization channel beam direction if beam correspondence applies.

12. The method of claim 2, wherein the communicating comprises transmitting the PRACH message using a beam selected based on measurement of at least one of: a downlink synchronization signal or a downlink reference signal if beam correspondence does not apply.

13. The method of claim 2, wherein the communicating comprises transmitting a radio resource control (RRC) connection request message using beam sweeping based on the determination.

14. The method of claim 13, further comprising:
receiving signaling from the BS indicating at least one of:
a direction of beams to use for the beam sweeping or a number of the beams to use for the beam sweeping.

15. The method of claim 1, wherein the determination is based on an indication in a random access response received from the BS indicating whether beam correspondence applies.

16. A method for wireless communications by a user equipment (UE), comprising:
receiving a random access response message from a wireless node; and
transmitting a radio resource control (RRC) connection request message to the wireless node, wherein the RRC connection request message comprises a payload and a synchronization sequence.

17. The method of claim 16, wherein the synchronization sequence is transmitted in a first portion of a symbol using multiple short orthogonal frequency division multiplexing (OFDM) symbols or single carrier frequency division multiplexed (SC FDM) symbols.

18. The method of claim 16, wherein at least one of: the synchronization sequence or payload is transmitted using beam sweeping.

19. The method of claim 16, wherein:
the synchronization sequence and the payload are both transmitted in at least one single carrier frequency division multiplexed (SC FDM) symbol; and
transmitting the synchronization sequence and the payload in the at least one SC FDM symbol comprises, at an input to a discrete Fourier transform (DFT) spreading operation:
successively placing modulation symbols of the synchronization sequence in the at least one SC FDM symbol; and
successively placing modulation symbols of the payload following the synchronization sequence modulation symbols in the at least one SC FDM symbol.

20. An apparatus for wireless communications, comprising:
at least one processor coupled with a memory and configured to determine whether beam correspondence between the apparatus and a base station (BS) applies at the apparatus, wherein determining whether beam correspondence applies comprises determining whether the apparatus can determine at least one of: a beam to use for uplink transmission based on a downlink reception beam or a beam to use for downlink reception based on an uplink transmission beam; and
a transmitter configured to provide an indication to the BS, via a physical random access channel (PRACH) message during a RACH procedure, of whether beam correspondence applies at the apparatus based on the determination.

21. The apparatus of claim 20, wherein the at least one processor is further configured to:
perform time division duplexing (TDD) communications with the BS in accordance with the determination.

22. The apparatus of claim 20, wherein the at least one processor is configured to determine whether beam correspondence applies based on at least one of: a time or an operation state of the apparatus.

23. The apparatus of claim 20, wherein the at least one processor is configured to determine that beam correspondence does not apply if at least one of: an initial RACH procedure has not been completed or a UE calibration has not been completed.

24. The apparatus of claim 20, wherein the at least one processor is configured to determine that beam correspondence applies if at least one of: an initial RACH procedure has been completed or a UE calibration has been completed.

25. The apparatus of claim 20, further comprising:
a receiver configured to receive an inquiry from the BS, wherein the indication is provided in response to the inquiry.

26. The apparatus of claim 25, wherein the indication is provided via a PRACH sequence.

27. An apparatus for wireless communications, comprising:
a receiver configured to receive a random access response message from a wireless node; and
a transmitter configured to transmit a radio resource control (RRC) connection request message to the wireless node, wherein the RRC connection request message comprises a payload and a synchronization sequence.

28. The apparatus of claim 27, wherein the transmitter is configured to transmit the synchronization sequence in a first portion of a symbol using multiple short orthogonal frequency division multiplexing (OFDM) symbols or single carrier frequency division multiplexed (SC FDM) symbols.

29. The apparatus of claim 27, wherein the transmitter is configured to transmit at least one of: the synchronization sequence or payload using beam sweeping.

30. The apparatus of claim 27, wherein the transmitter is configured to:
transmit both the synchronization sequence and the payload in at least one single carrier frequency division multiplexed (SC FDM) symbol; and
transmit the synchronization sequence and the payload in the at least one SC FDM symbol by, at an input to a discrete Fourier transform (DFT) spreading operation:
successively placing modulation symbols of the synchronization sequence in the at least one SC FDM symbol; and successively placing modulation symbols of the payload following the synchronization sequence modulation symbols in the at least one SC FDM symbol.

\* \* \* \* \*